(12) United States Patent
Lloyd

(10) Patent No.: US 7,559,644 B1
(45) Date of Patent: Jul. 14, 2009

(54) EYEGLASS FRAME INCORPORATING ORNAMENTED TEMPLE MEMBERS

(76) Inventor: Steve Lloyd, 185 S. Myers St., Los Angeles, CA (US) 90033

( * ) Notice: Subject to any disclaimer, the term of this patent is extended or adjusted under 35 U.S.C. 154(b) by 0 days.

(21) Appl. No.: 12/012,972

(22) Filed: Feb. 7, 2008

(51) Int. Cl.
G02C 11/02 (2006.01)
(52) U.S. Cl. .......................................... 351/51; 351/52
(58) Field of Classification Search ................ 351/41, 351/51, 52, 121; D16/335, 336
See application file for complete search history.

(56) References Cited

U.S. PATENT DOCUMENTS

| | | | |
|---|---|---|---|
| 4,389,102 A | 6/1983 | Piampiano | |
| 4,884,883 A | 12/1989 | Chappell | |
| 5,020,150 A | 5/1991 | Shannon | |
| 5,185,620 A | 2/1993 | Cooper | |
| D341,609 S | 11/1993 | Lloyd | |
| 5,497,211 A | 3/1996 | McNulty | |
| 5,652,635 A * | 7/1997 | Kirschner | 351/52 |
| 5,896,184 A | 4/1999 | Lowe et al. | |
| 6,322,212 B1 | 11/2001 | Kliot | |

* cited by examiner

*Primary Examiner*—Huy K Mai
(74) *Attorney, Agent, or Firm*—Michael A. Painter

(57) ABSTRACT

An eyeglass frame incorporates coupled temple frame members that are adapted to receive interchangeable ornamental trim members. Each trim member comprises an elongated, flexible ornamental assembly that is spirally mounted about each temple frame member between opposed predetermined locations along the longitudinal axis thereof. First and second trim positioners are secured to the ends of the trim member. The trim positioners are coupled to trim receivers that are secured to the temple frame members substantially adjacent the opposed predetermined locations thereof.

12 Claims, 3 Drawing Sheets

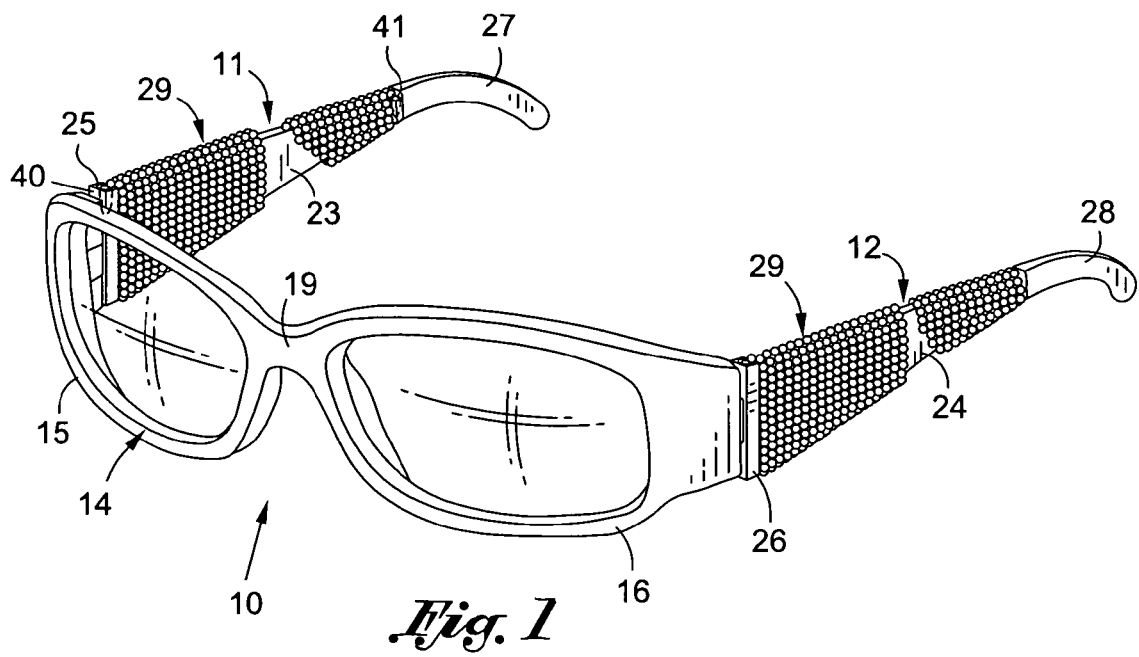
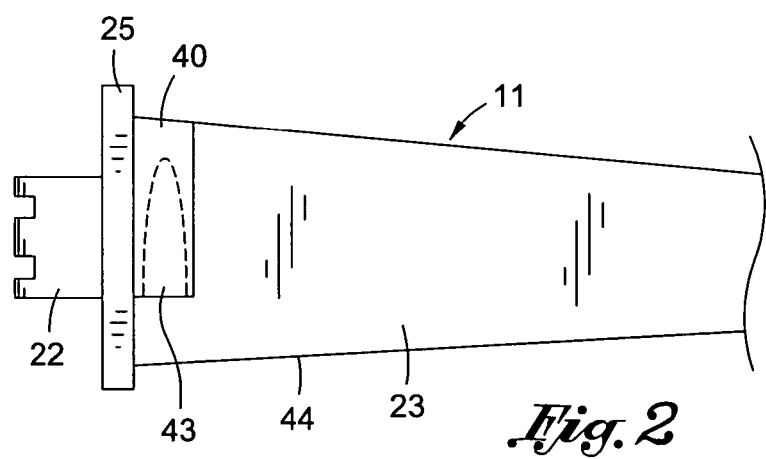
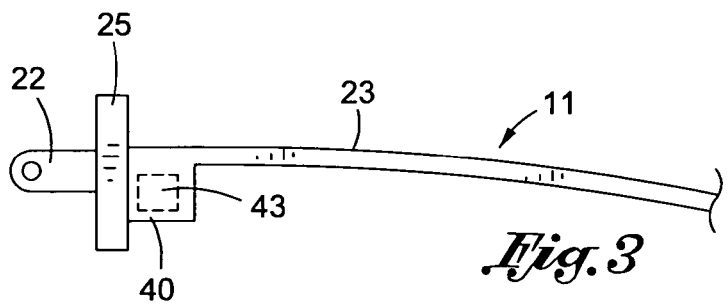

EYEGLASS FRAME INCORPORATING ORNAMENTED TEMPLE MEMBERS

BACKGROUND OF THE INVENTION

1. Field of the Invention

The invention generally relates to ornamented eye-glass frames and in particular to eyeglass frames incorporating temple frame members that are adapted to receive interchangeable ornamental trim members.

2. Prior Art

The prior art discloses numerous references that embody eyeglass frames having temple members and/or frame surfaces that are ornamented. An example of a reference that illustrates a device for ornamenting the temple frame members of eyeglasses is Applicant's patent No. D-341,609. The design disclosed is a tubular assembly of individual ornaments that can be removably disposed upon the temple frame member. The device shown is substantially uniform along its length and therefore is incapable of conforming to the shape of the temple frame member. The present invention design overcomes the inadequacy of the reference by using an ornamented trim member that is spirally mounted upon the central portion of the temple frame member and therefore conform to the actual geometrical configuration of the temple frame member.

A second example of ornamented eyeglass frames disclosed by the prior art is set forth in U.S. Pat. No. 2,960,787 which uses ornamental suspending members having a planar body with rivets secured perpendicularly to the temple contacting surface of the body and include a hook on a surface near the center of the planar body. A particularly shaped hook having jewels or other ornamental designs is removable attached to the hook formed by the slits in the planar body. However, a primary difficulty of this reference is the inability to interchange the ornamented features with others that can be selected by the user. The present invention fully resolves this inadequacy.

A third example of ornamented eyeglass frames disclosed in the prior art is set forth in U.S. Pat. No. 4,884,883 in which clip-on decorative parts or wings are provided and can be mounted to the front surface of the frame adjacent the lens. However, the device described in the prior art does not provide for the ease of interchangeability of the decorative wings in the manner utilized by the present invention.

The present invention resolves the inadequacies disclosed by the prior art. The present invention provides for interchangeable, ornamental trim members to be removably secured about the temple members of eyeglass frames. A trim member comprises an elongated, flexible ornamental assembly that is adapted to be spirally wound about each temple frame between selected locations along the temple member at which trim receivers are secured to the temple frame. Trim positioners are secured to the opposed ends of each trim member and are adapted to be removably secured to the respective trim receivers. Each trim frame member may be ornamented at the discretion of the user and is interchangeable with other trim members having trim positioners secured at the opposed terminus thereof.

SUMMARY OF THE INVENTION

The present invention utilizes eyeglass frames having a pair of elongated temple members that are each adapted to be ornamented through the use of interchangeable trim members. The forward terminus of each temple member is adapted to be hingedly coupled to the front portion of the eyeglass frame. The portion of the temple member at the front thereof is adjacent a positioning flange that extends outwardly from the central section of the temple member. The rear portion of each temple member extends into an earpiece that is adapted to engage the user's ear. The central portion of a temple member is bounded by the earpiece and the hinged coupling and is adapted to receive ornamented trim members.

Each trim member comprises an elongated, flexible ornamental assembly that can be spirally mounted about the central portion of a temple frame member intermediate the earpiece and the hinged coupling. Although it is understood that a trim member can be constructed solely of a uniform elongated, flexible strand, a description of the preferred embodiment of the invention will use a trim member that is constructed of an elongated strand upon which a plurality of uniform ornaments (e.g., beads) are mount thereon. First and second trim positioners are secured at the opposed ends of each trim member, the trim positioners being adapted to be removably secured within first and second trim receivers respectively. The first trim receiver is secured to the central portion of the temple member adjacent the hinged coupling. The second trim receiver is secured to the temple member adjacent the earpiece. An exemplary trim member consists of a flexible strand upon which a plurality of uniform decorative objects are mounted, the ornamental objects being secured upon the strand by the trim positioners.

In use, the ornamented trim members are spirally wound about the central portion of the temple frame members. The trim positioner at the end of a trim member is secured within the trim receiver adjacent the hinged coupling. The trim positioner at the opposed end of the trim member is coupled to the trim receiver adjacent the earpiece.

It is an object of the present invention to provide an improved design for ornamented eyeglass frames.

It is another object of the present invention to provide ornamentation for the temple members of eyeglass frames.

It is still another object of the present invention to provide ornamentation for the temple frame members of eyeglass frames that is interchangeable.

It still yet another object of the present invention to provide ornamented eyeglass frames that are simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWINGS

FIG. 1 is a perspective view of eyeglass frames employing temple frame members ornamented in accordance with the present invention.

FIG. 2 is a partial side elevation view of the forward end of a temple frame member shown in FIG. 1.

FIG. 3 is a top plan view of the portion of the temple frame member shown in FIG. 3.

DESCRIPTION OF THE PRESENTLY PREFERRED EMBODIMENT

Figure 4:
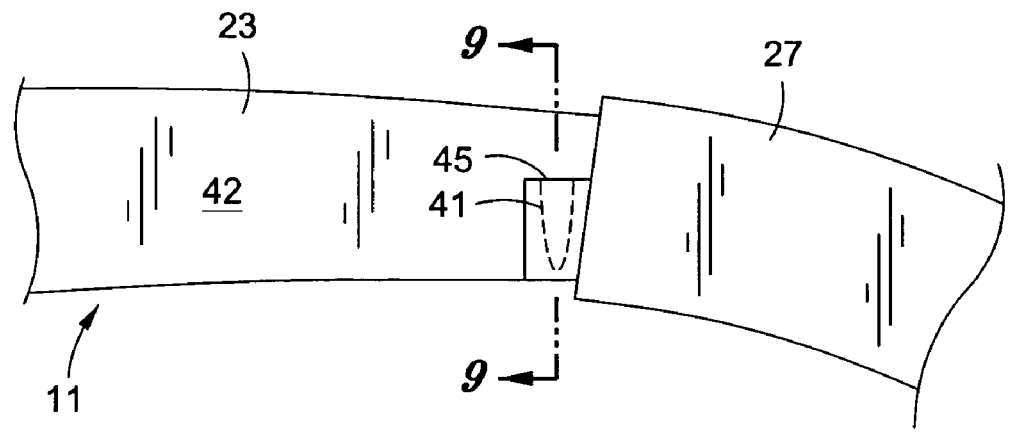
FIG. 4 is a partial side elevation view of the rear portion of a temple frame member shown in FIG. 1.

A general understanding of the present invention can be gained from FIGS. 1-5, inclusive, wherein an eyeglass assembly 10 and ornamented temple members 11 and 12 are shown. The eyeglass unit includes a front frame unit 14 having two lens holding elements 15 and 16 which hold lenses 17 and 18, respectively. It is understood that the lenses 17 and 18 may be prescription or non-prescription and may be darkened or clear. A nose bridge 19 connects the two lens-holding elements 15 and 16 together and serves to support the frame 13 on the face of the user. Two temple frame members 11 and 12 which are ornamented in accordance with the present invention are hingedly coupled to lens holding elements 15 and 16, respectively, by conventional hinges.

It is an objective of the present invention to provide eyeglass frames having ornamented temple frame members 20 and 21. The structure of temple frame members 11 and 12 can be best understood by reference to FIGS. 2-5, inclusive. Although FIGS. 2-5, inclusive, illustrate enlarged views of front and rear portions of temple frame member 11, it is understood that the discussion applies equally to temple frame member 12.

The forward end of each temple frame member 11 and 12 extends into a hinge element 22 that is coupled into a mating hinge element (not shown) of lens holding elements 15 and 16. The central portions 23 and 24 of temple frame members 11 and 12, respectively, extend forwardly to bracing flanges 25 and 26 respectively. The distal rear end of central portions 23 and 24 extend to ear pieces 27 and 28, respectively. As shown in FIG. 1, ornamented trim members 29 are spirally wound about central portion 23 and 24 of temple frame members 11 and 12, respectively.

As will be discussed in detail hereinbelow, each ornamented trim member 29 consists of an elongated flexible strand 35 onto which ornamental objects 36 such as beads or jewels are mounted. Although the preferred embodiment of the present invention specifically described with respect to the use of threaded ornamental beads or jewels for ornamented objects 36 on a thread or cord, it is understood that the scope of the present invention encompasses use of other conventional ornaments and any conventional elongated, flexible strand that can be spirally wound about central portions 23 and 24 of temple frame members 11 and 12.

Figure 6:
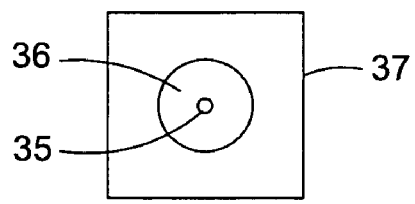
FIG. 6 is a top plan view of a trim positioner.
Figure 7:
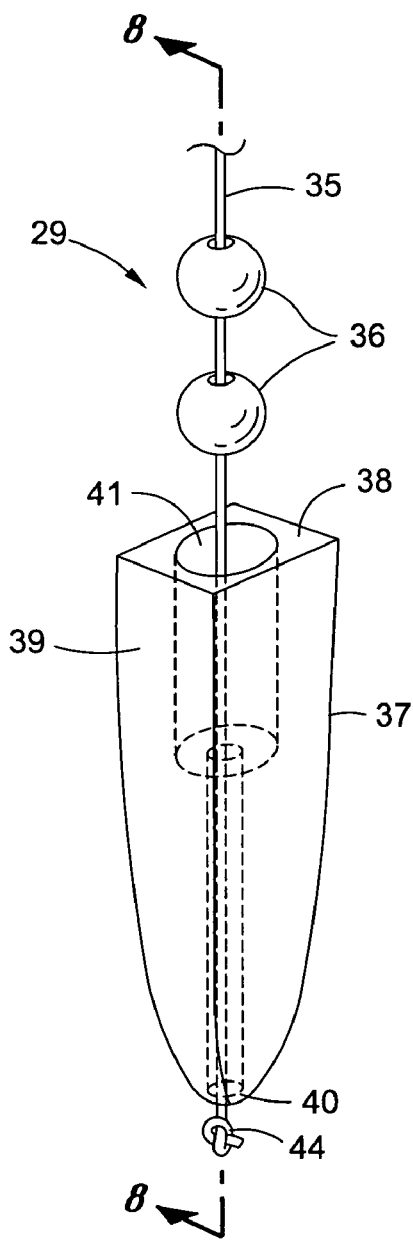
FIG. 7 is a perspective view of a trim positioner illustrating an end of an ornament trim member secured thereto.
Figure 8:
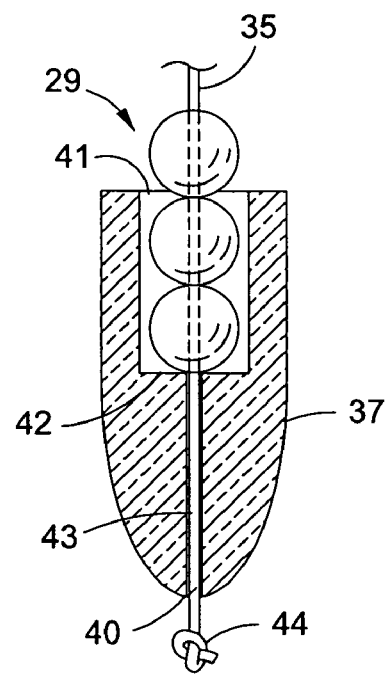
FIG. 8 is a cross-sectional view of the trim positioner and secured trim member shown in FIG. 7 taken through line 8-8 of FIG. 7.
Figure 9:
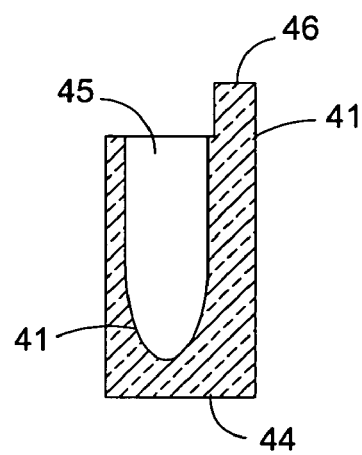
FIG. 9 is a cross-sectional view of the trim receiver shown in FIG. 4 taken through line 9-9 of FIG. 4.

The manner in which the ornamented trim member 29 is secured about the central portions 23 of temple frame member 11 can be best understood by reference to FIGS. 6, 7 and 8. Each end of the ornamented trim member 29 is secured to a trim member positioner 37. As shown in FIGS. 6, 7 and 8, the upper terminus 38 of the preferred embodiment of trim member positioner 37 is preferably square, the four uniform sides 39 thereof being tapered to the distal end 40 thereof. A first cylindrical aperture 41 having a diameter substantially equal to the diameter of the ornamental beads 36 is disposed axially into trim member positioner 37 starting at upper end 38. At the lower end 42 of aperture 41 a second aperture 43 is adapted to receive strand 35 axially disposed into trim member positioner 37, aperture 43 exiting at terminus 40 of trim member positioner 37. To secure an end of ornamented trim member 29 to trim member positioner 37, an end of strand 35 is extended through aperture 43 until an ornamented object 36 is in contact with the lower end 42 of aperture 41. The end of strand 35 is oriented into a knot 44 or otherwise secured in place to prevent strand 35 from being inadvertently displaced from trim positioner 37.

Figure 5:
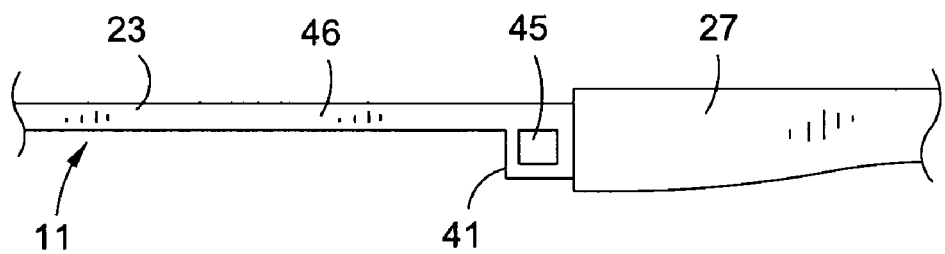
FIG. 5 is a top plan view of the portion of the temple frame member shown in FIG. 4.

Referring now to FIGS. 1, 2, 3, 4, 5 and 9, to interchangeably secure the ornamented trim member 29 about temple frame member 11, the trim member positioners 37 are removably secured within frontal trim receivers 40 and rear trim receivers 41. The frontal and rear trim receivers 40 and 41 are formed or otherwise secured along the inner surface 42 of the temple frame member 11 which will be positioned adjacent the user's head. It is an objective of the present invention to spiral the ornamented trim members 29 about the central portions 23 and 24 of temple frame members 11 and 12, respectively. Therefore, as shown in FIGS. 2 and 3, the opening 43 of frontal trim receiver 40 will be adjacent the bottom edge 44 of temple frame member 11. As can be seen in FIG. 4 and FIG. 5, the opening 45 is adapted to receive trim positioner 37 will be adjacent the top edge 46 of temple frame member 11. To achieve the coupling of trim positioners 37 and the frontal and rear trim receivers 40 and 41, the openings 43 and 45 are configured such that the opening thereof will be adapted to mirror the outside surface of trim positioner 37. Again, it is understood that securing the trim positioners 37 to trim receivers 40 and 41 mounted on temple frame member 11 is equally applicable to trim receivers secured to temple frame member 12.

In order to implement the present invention, the trim positioner 37 affixed to one end of ornamented trim member 29 is inserted into and secured to forward trim receiver 40. The strand and mounted ornamented objects 36 are spirally would around central portion 23. Where the ornamented trim member 29 is adjacent rear trim receiver 41, the trim positioner is inserted within aperture 45 of rear trim receiver 41 and secured therein.

Although the structure utilized in the preferred embodiment of the invention to secure ornamented trim members 29 about temple frame members 11 and 12 is the form of trim positioners 37 and trim receivers 40 and 41 described, it is understood by those having skill in the art that other conventional means utilizing mating elements attached to strand 35 and secured to or incorporated as part of the temple frame members 11 and 12 can be employed.

I claim:

1. An eyeglass frame incorporating ornamented temple frame members comprising:
   (a) a front unit including a pair of coupled lens-holding elements;
   (b) first and second temple frame members each consisting of a frontal portion, a central portion and a distal rear portion, said central portion comprising inner and outer opposed surfaces and top and bottom opposed surfaces, a planar bracing flange being integral with and disposed between said frontal portion and said central portion and extending beyond the inner, outer, top and bottom surfaces of said central portion, and an earpiece secured to said central portion opposed to the bracing flange, said frontal portion of said first and second temple frame members being hingedly coupled to one of said lens-holding elements respectively;
   (c) an elongated, flexible ornamented trim member having first and second ends thereof spirally disposed about the central portion of each of said first and second temple frame members;

(d) frontal trim receiving means secured to the central portion of each of said temple frame members adjacent the bracing flange for securing the first end of said ornamented trim member;

(e) rear trim receiving means secured to the central portion of each of said temple frame members adjacent the interface between said central portion and the earpiece for securing the second end of said ornamented trim member; and (f) first and second trim positioning means coupled to the ornamented trim member at the first and second ends thereof, respectively, for coupling said first and second ends of said ornamented trim members to the frontal trim receiving means and said rear trim receiving means.

2. An eyeglass frame as defined in claim 1 wherein said frontal trim receiving means and said rear trim receiving means are secured to the inner surface of the central portion of said temple frame members.

3. An eyeglass frame as defined in claim 1 wherein said ornamented trim member comprises an elongated strand upon which a plurality of ornamented beads are mounted thereon.

4. An eyeglass frame as defined in claim 3 wherein the ornamented beads are mounted contiguous to one another upon said strand.

5. An eyeglass frame as defined in claim 1 wherein said first and second trim positioning means are removably coupled to said first and second trim receiving means, respectively.

6. An eyeglass frame as defined in claim 1 wherein said trim member comprises an elongated, flexible strand having first and second ends and having a plurality of ornamented members disposed upon said strand adjacent one another, the first end of said strand being secured to said first trim positioning member and the second end of said strand being secured to the second trim positioning member.

7. An eyeglass frame as defined in claim 6 wherein said ornamented members are uniform spherical beads.

8. An eyeglass frame as defined in claim 6 wherein each of said first and second trim positioning means comprise an axially tapered member having top and bottom ends and an outer surface tapered uniformly from the top end to the bottom end, and having a first axially disposed aperture disposed into said tapered member at the top end thereof adapted to receive the ornamented members and a second axially disposed aperture disposed in said tapered member between the bottom end thereof and said first aperture adapted to the strand.

9. An eyeglass as defined in claim 8 wherein said frontal and rear trim receiving means and include a uniformly disposed axially tapered aperture adapted to receive the uniformly tapered outer surface of a tapered trim positioner.

10. An eyeglass frame incorporating ornamented temple frame members comprising:

(a) a front unit including a pair of coupled lens-holding elements;

(b) first and second temple frame members each consisting of a frontal portion, a central portion and a distal rear portion, said central portion comprising inner and outer opposed surfaces and top and bottom opposed surfaces, a planar bracing flange being integral with and disposed between said frontal portion and said central portion and extending beyond the inner, outer, top and bottom surfaces of said central portion, and an earpiece secured to said central portion opposed to the bracing flange, said frontal portion of said first and second temple frame members being hingedly coupled to one of said lens-holding elements respectively;

(c) a trim member spirally disposed about the central portion of said first and second temple frame members comprising an elongated, flexible strand having first and second ends and having a plurality of ornamented members disposed upon said strand adjacent one another, the first end of said strand being secured to a first trim positioning member and the second end of said strand being secured to the second trim positioning member;

(d) frontal trim receiving means secured to the central portion of each of said temple frame members adjacent the bracing flange for securing the first end of said ornamented trim member;

(e) rear trim receiving means secured to the central portion of each of said temple frame members adjacent the interface between said central portion and the earpiece for securing the second end of said ornamented trim member; and (f) first and second trim positioning members coupled to the first and second ends of said strand, said first and second trim positioners each comprising an axially tapered member having top and bottom ends and an outer surface tapered uniformly from the top end to the bottom end, and having a first axially disposed aperture disposed into said tapered member at the top end thereof adapted to receive the ornamented members and a second axially disposed aperture disposed in said tapered member between the bottom end thereof and said first aperture adapted to receive the strand, the first trim positioning members being coupled to said frontal trim receiving means and said second trim positioning members being coupled to said rear trim receiving means.

11. An eyeglass frame as defined in claim 10 wherein the ornamented beads are mounted contiguous to one another upon said strand.

12. An eyeglass frame as defined in claim 10 wherein said ornamented members are uniform spherical beads.

\* \* \* \* \*